(12) United States Patent
Parson

(10) Patent No.: US 6,511,018 B1
(45) Date of Patent: Jan. 28, 2003

(54) AIR DROP CONTAINER ASSEMBLY

(76) Inventor: Willie M. Parson, 2722 Gwynnmore Ave., Baltimore, MD (US) 21207

(*) Notice: Subject to any disclaimer, the term of this patent is extended or adjusted under 35 U.S.C. 154(b) by 0 days.

(21) Appl. No.: 09/689,947

(22) Filed: Oct. 13, 2000

(51) Int. Cl.⁷ ............................................... B64D 25/12
(52) U.S. Cl. ...................................... 244/137.1; 244/147
(58) Field of Search ........................... 244/137.1, 137.3, 244/138 R, 142, 147, 149, 148, 137.4; 206/521, 521.15, 583, 521.5

(56) References Cited

U.S. PATENT DOCUMENTS

| | | | | |
|---|---|---|---|---|
| 1,192,479 A | * | 7/1916 | Van Meter | |
| 1,585,684 A | * | 5/1926 | Oppenheim | |
| 1,768,194 A | * | 6/1930 | Donnell | |
| 2,280,155 A | * | 4/1942 | Luce | |
| 2,514,295 A | * | 7/1950 | Scurich | |
| 2,547,005 A | * | 4/1951 | Herrick et al. | |
| 2,671,623 A | * | 3/1954 | Toulmin | |
| 2,687,263 A | * | 8/1954 | Frieder et al. | |
| 2,958,487 A | | 11/1960 | Fraebel | |
| 3,050,278 A | * | 8/1962 | Gardner et al. | |
| 3,087,697 A | * | 4/1963 | Potts | |
| 3,410,511 A | | 11/1968 | Coppa | |
| 3,580,469 A | * | 5/1971 | Reese | |
| D221,488 S | | 8/1971 | Olsen et al. | |
| 3,625,461 A | | 12/1971 | Guienne | |
| 3,769,145 A | * | 10/1973 | Gresham et al. | |
| 4,205,811 A | | 6/1980 | Palm et al. | |
| 5,255,806 A | * | 10/1993 | Korzeniowski et al. | |
| 5,356,097 A | * | 10/1994 | Chalupa | |
| 5,542,626 A | * | 8/1996 | Beuck et al. | |
| 5,568,902 A | | 10/1996 | Hurley, Jr. | |
| 5,873,585 A | * | 2/1999 | Engelking | |
| 6,092,654 A | * | 7/2000 | Webb | |

* cited by examiner

Primary Examiner—Charles T. Jordan
Assistant Examiner—T. Dinh

(57) ABSTRACT

An air drop container assembly for providing an improved air-drop container for the military and emergency operations. The air drop container assembly includes a container having a top wall, a bottom wall, side walls, and a plurality of compartments disposed therein; and also includes a parachute assembly including a cover being removably disposed upon the top wall of the container and also including a parachute member being removably attached to the container; and further includes a cargo protection assembly being disposed in the container; and also includes a weight assembly also being disposed in the container for providing the container with proper flight orientation as the container is falling through air.

1 Claim, 3 Drawing Sheets

Fig.1

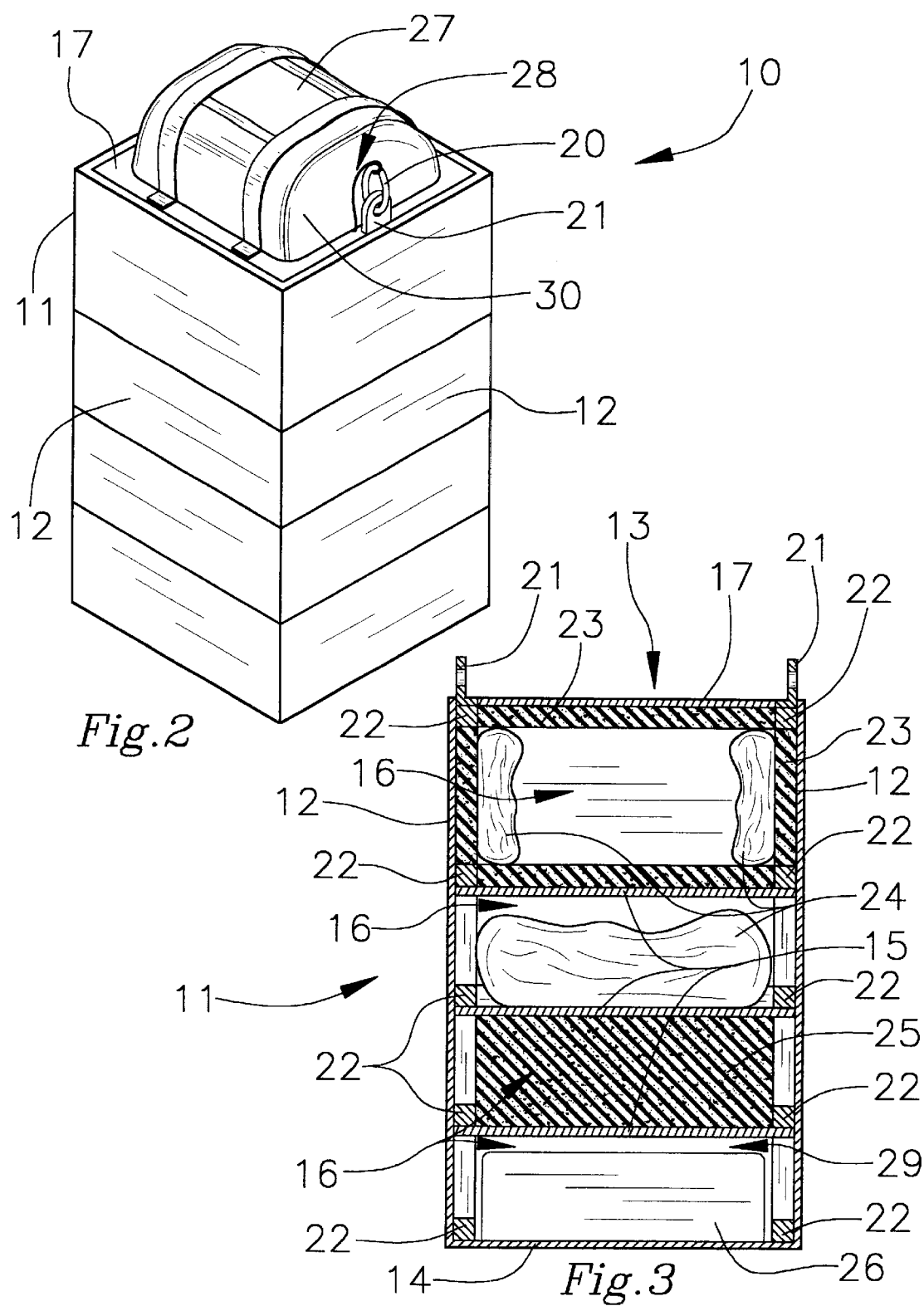

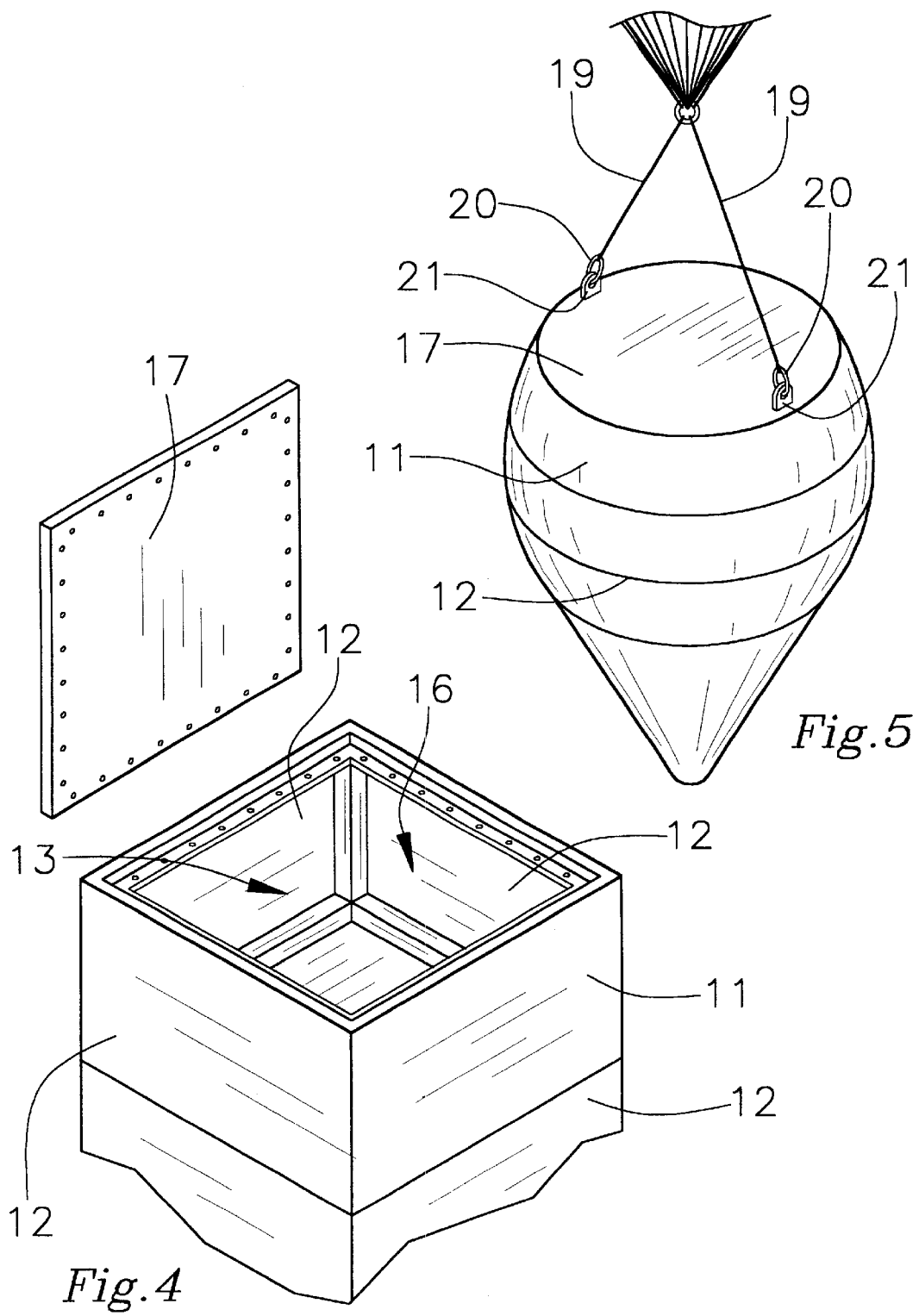

AIR DROP CONTAINER ASSEMBLY

BACKGROUND OF THE INVENTION

1. Field of the Invention

The present invention relates to cargo parachute assembly and more particularly pertains to a new air drop container assembly for providing an improved air-drop container for the military and emergency operations.

2. Description of the Prior Art

The use of cargo parachute assembly is known in the prior art. More specifically, cargo parachute assembly heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 4,205,811; 3,625,461; 2,958,487; 3,410,511; 5,568,902; and Des 221,488.

While these devices fulfill their respective, particular objectives and requirements, the aforementioned patents do not disclose a new air drop container assembly. The inventive device includes a container having a top wall, a bottom wall, side walls, and a plurality of compartments disposed therein; and also includes a parachute assembly including a cover being removably disposed upon the top wall of the container and also including a parachute member being removably attached to the container; and further includes a cargo protection assembly being disposed in the container; and also includes a weight assembly also being disposed in the container for providing the container with proper flight orientation as the container is falling through air.

In these respects, the air drop container assembly according to the present invention substantially departs from the conventional concepts and designs of the prior art, and in so doing provides an apparatus primarily developed for the purpose of providing an improved air-drop container for the military and emergency operations.

SUMMARY OF THE INVENTION

In view of the foregoing disadvantages inherent in the known types of cargo parachute assembly now present in the prior art, the present invention provides a new air drop container assembly construction wherein the same can be utilized for providing an improved air-drop container for the military and emergency operations.

The general purpose of the present invention, which will be described subsequently in greater detail, is to provide a new air drop container assembly apparatus and method which has many of the advantages of the cargo parachute assembly mentioned heretofore and many novel features that result in a new air drop container assembly which is not anticipated, rendered obvious, suggested, or even implied by any of the prior art cargo parachute assembly, either alone or in any combination thereof.

To attain this, the present invention generally comprises a container having a top wall, a bottom wall, side walls, and a plurality of compartments disposed therein; and also includes a parachute assembly including a cover being removably disposed upon the top wall of the container and also including a parachute member being removably attached to the container; and further includes a cargo protection assembly being disposed in the container; and also includes a weight assembly also being disposed in the container for providing the container with proper flight orientation as the container is falling through air.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new air drop container assembly apparatus and method which has many of the advantages of the cargo parachute assembly mentioned heretofore and many novel features that result in a new air drop container assembly which is not anticipated, rendered obvious, suggested, or even implied by any of the prior art cargo parachute assembly, either alone or in any combination thereof.

It is another object of the present invention to provide a new air drop container assembly which may be easily and efficiently manufactured and marketed.

It is a further object of the present invention to provide a new air drop container assembly which is of a durable and reliable construction.

An even further object of the present invention is to provide a new air drop container assembly which is susceptible of a low cost of manufacture with regard to both materials and labor, and which accordingly is then susceptible of low prices of sale to the consuming public, thereby making such air drop container assembly economically available to the buying public.

Still yet another object of the present invention is to provide a new air drop container assembly which provides in the apparatuses and methods of the prior art some of the advantages thereof, while simultaneously overcoming some of the disadvantages normally associated therewith.

Still another object of the present invention is to provide a new air drop container assembly for providing an improved air-drop container for the military and emergency operations.

Yet another object of the present invention is to provide a new air drop container assembly which includes a container having a top wall, a bottom wall, side walls, and a plurality of compartments disposed therein; and also includes a parachute assembly including a cover being removably disposed upon the top wall of the container and also including a parachute member being removably attached to the container; and further includes a cargo protection assembly being disposed in the container; and also includes a weight assembly also being disposed in the container for providing the container with proper flight orientation as the container is falling through air.

Still yet another object of the present invention is to provide a new air drop container assembly that substantially reduces the impact to the cargo stored therein Even still another object of the present invention is to provide a new air drop container assembly that virtually eliminates damage to the cargo stored therein.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 2 is a perspective view of the present invention.

FIG. 3 is a cross-sectional view of the present invention.

FIG. 4 is a partial perspective view of the container of the present invention.

FIG. 5 is a partial perspective view of a second embodiment of the present invention.

DESCRIPTION OF THE PREFERRED EMBODIMENT

Figure 1:
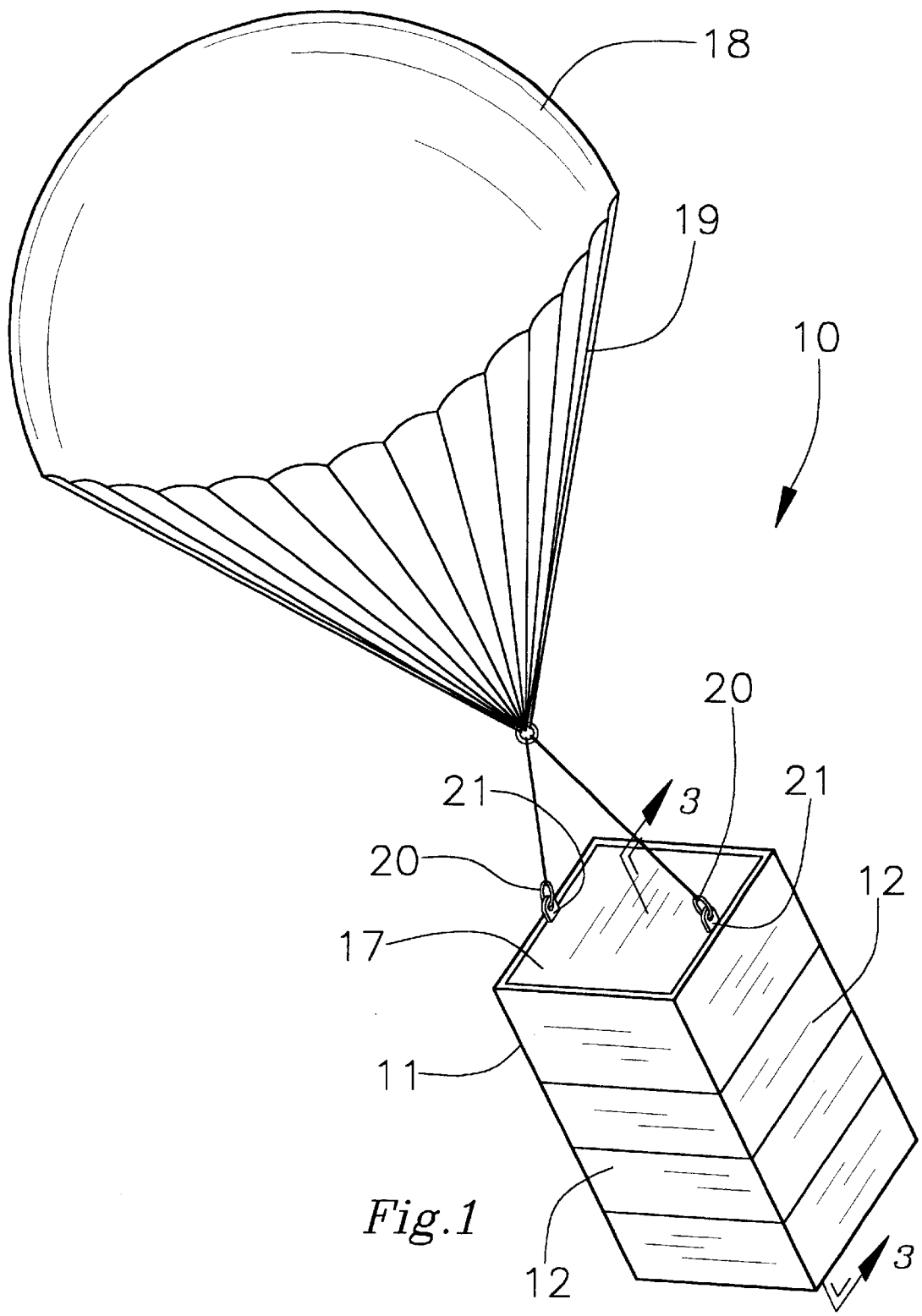
FIG. 1 is a perspective view of a new air drop container assembly according to the present invention shown in use.

With reference now to the drawings, and in particular to FIGS. 1 through 5 thereof, a new air drop container assembly embodying the principles and concepts of the present invention and generally designated by the reference numeral 10 will be described.

As best illustrated in FIGS. 1 through 5, the air drop container assembly 10 generally comprises a container 11 having a removable lid 17 disposed upon a top thereof, a bottom wall 14, side walls 12, and a plurality of compartments 16,29 disposed therein. The container 11 also includes intermediate walls 15 being spaced apart and being securely disposed therein and being adapted to form the compartments 16,29. The container 11 can be of any shape including rectangular and conical.

A parachute assembly includes a hatch 27 having slots 28 in side walls 30 thereof and being removably disposed upon the lid 17 of the container 11 and also includes a parachute member 18 being removably and conventionally attached to the container 11. The parachute assembly also includes eyelets 21 being opposedly and securely and conventionally attached upon the side walls 12 of the container 11. The parachute member 18 includes anchor members 20 being securely and conventionally attached to the eyelets 21 and also includes flexible lines 19 being securely and conventionally attached to the anchor members 20 with the parachute member 18 being releasably stored upon the lid 17 of the container 11 and being releasably covered by the hatch 27.

A cargo protection assembly is disposed in the container 11 and includes a tubular frame 22 being securely and conventionally disposed at corners of the compartments 16,29 in the container 11, and also includes padding material 23 securely lining the compartments 16,29 in the container 11 between the tubular frame 22, and further includes an air bag 24 securely and conventionally disposed in the container 11, and also includes a cushion 25 being securely disposed in one of the compartments 16 of the container 11 for lessening impact to cargo stored in the container 11.

A weight assembly is also disposed in the container 11 for providing the container 11 with proper orientation as the container 11 is falling through air. The weight assembly includes at least one weight member 26 being disposed in the bottom-most compartment 29 in the container 11 to position a free-falling container 11.

In use, the user places cargo in one of the compartments 16 through the open top 13 of the container 11 and closes the container 11 with the lid 17 and secures the parachute member 18 upon the lid 17 and beneath the hatch 27. Once the container 11 is dropped out of an aircraft, the hatch 27 is removed and the parachute member 18 is released and deployed with the cargo protection assembly being used to protect the cargo upon the container 11 hitting the ground.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An air drop container assembly comprising:

a container having a removable lid, a bottom wall, side walls, and a plurality of compartments disposed therein, said container also including intermediate walls being spaced apart and being securely disposed therein and being adapted to form at least three of said compartments, each of said intermediate walls having a perimeter mounted on said side walls such that said intermediate walls separate adjacent said compartments from each other, said intermediate walls extending substantially parallel to said bottom wall such that said compartments are stacked relative to each other between said lid and said bottom wall, said container having a shape with a spheroidal upper portion and a conical lower portion;

a parachute assembly including a hatch having side walls and slots disposed therethrough and being removably disposed upon said lid of said container and also including a parachute member being removably attached to said container, said parachute assembly also including eyelets being opposedly and securely attached upon said side walls of said container, said parachute member including anchor members being securely attached to said eyelets and also including flexible lines being securely attached to said anchor members, said parachute member being releasably stored upon said lid of said container and being releasably covered by said hatch;

a cargo protection assembly disposed in said container, said cargo protection assembly including a tubular frame disposed at corners of said compartments in said container; and a weight assembly also being disposed in said container for providing said container with proper orientation as said container is falling through air, said weight assembly including at least one weight member being disposed in a bottom-most said compartment in said container to position a free-falling said container;

wherein said cargo protection assembly comprises:

a cushion positioned in a first intermediate one of said compartments located above the bottom-most compartment;

an air bag positioned in a second intermediate one of said compartments located above the said compartment in which said cushion is positioned;

wherein one of said compartments comprises a cargo compartment, said cargo compartment being located above said bottom-most compartment and said first and second intermediate compartments, wherein said cargo compartment forms an upper-most one of said compartments;

padding material lining an outer periphery of the cargo compartment, the padding material extending along an inward surface of said lid and along an inward surface of the said intermediate wall adjacent the cargo compartment, the padding material being positioned along said side walls to minimize damage from lateral movement of cargo in said cargo compartment;

a plurality of air bags positioned in the cargo compartment adjacent to the padding material for positioning cargo between said air bags.

* * * * *